May 15, 1928.

L. CALESTINI 1,669,410

AUTOMOBILE JACK STRUCTURE

Filed March 24, 1926

INVENTOR
*L. Calestini*
BY
ATTORNEY

May 15, 1928.
L. CALESTINI
1,669,410
AUTOMOBILE JACK STRUCTURE
Filed March 24, 1926   2 Sheets-Sheet 2
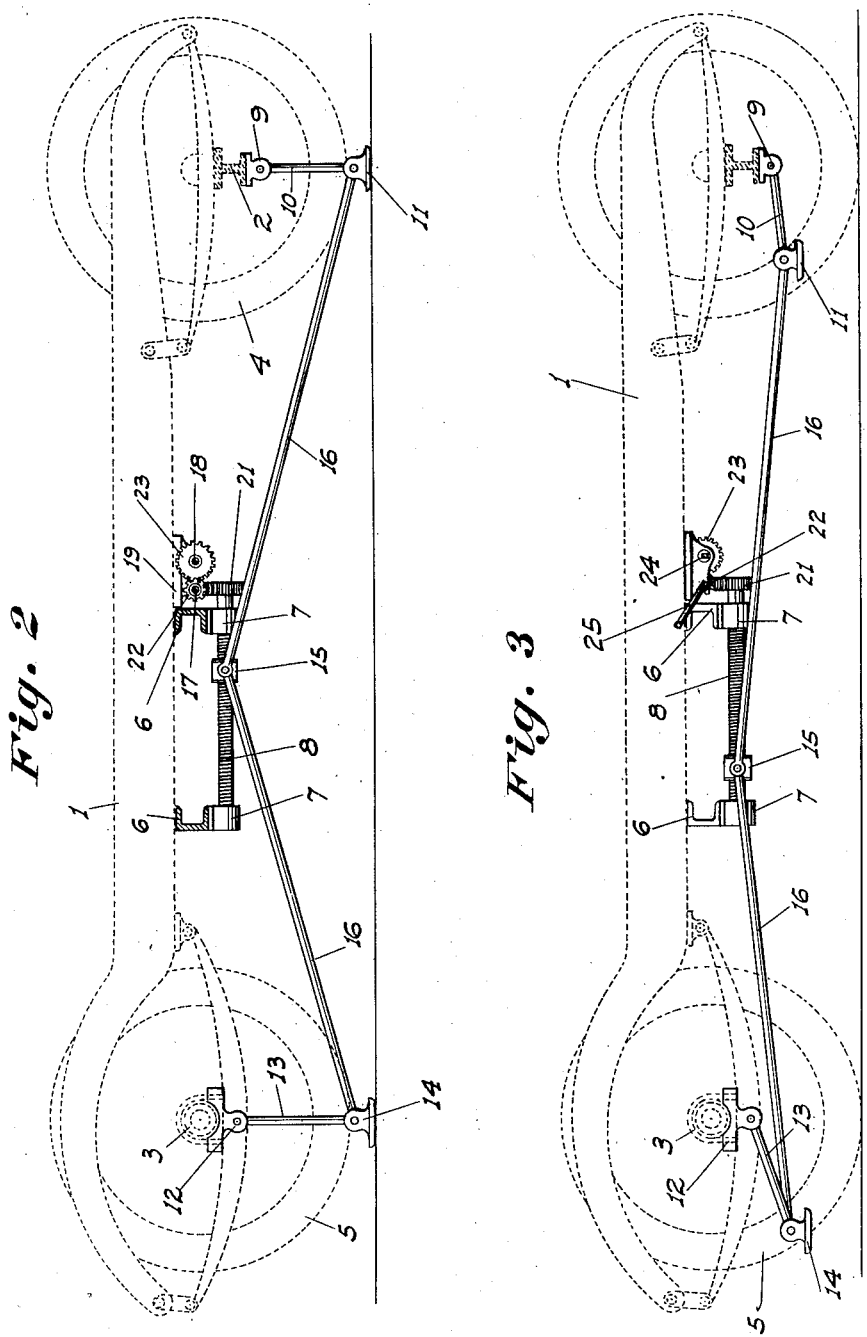
INVENTOR
*L. Calestini*
BY
ATTORNEY Patented May 15, 1928.

1,669,410

UNITED STATES PATENT OFFICE.

LUIGI CALESTINI, OF TARSAGNO, ITALY.

AUTOMOBILE JACK STRUCTURE.

Application filed March 24, 1926. Serial No. 96,944.

This invention relates to improvements in automobile jacks, my principal object being to provide a jack structure adapted to be permanently mounted on the vehicle by means of which all the wheels of such vehicle will be raised simultaneously.

My apparatus does away with the need of the single portable jack now commonly employed to raise any one wheel, and which is hard and cumbersome to manipulate, especially when a tire is deflated and it is necessary to lift the corresponding wheel a considerable distance to raise it above its normal level to make a tire displacement.

My apparatus is easily manipulated under any and all conditions without danger of the operator soiling his clothes by contact with greasy parts of the car or with the road. Its use enables tire changes to be very easily made, it simplifies the work of lubricating the under parts of the car; it enables the weight of the car to be held off the tires when the car is not in use; and permits the car to be lifted bodily when the wheels are in the mud or in other tractionless material, allowing a solid foundation being then placed under the wheels to enable the car to be run onto firm ground.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claim.

In the drawings similar characters of reference indicate corresponding parts in the several views:

Fig. 2 is a side outline of the chassis showing my jack structure in a wheel raising position.

Fig. 3 is a similar view showing the jack structure in its normal or inoperative position.

Figure 1:
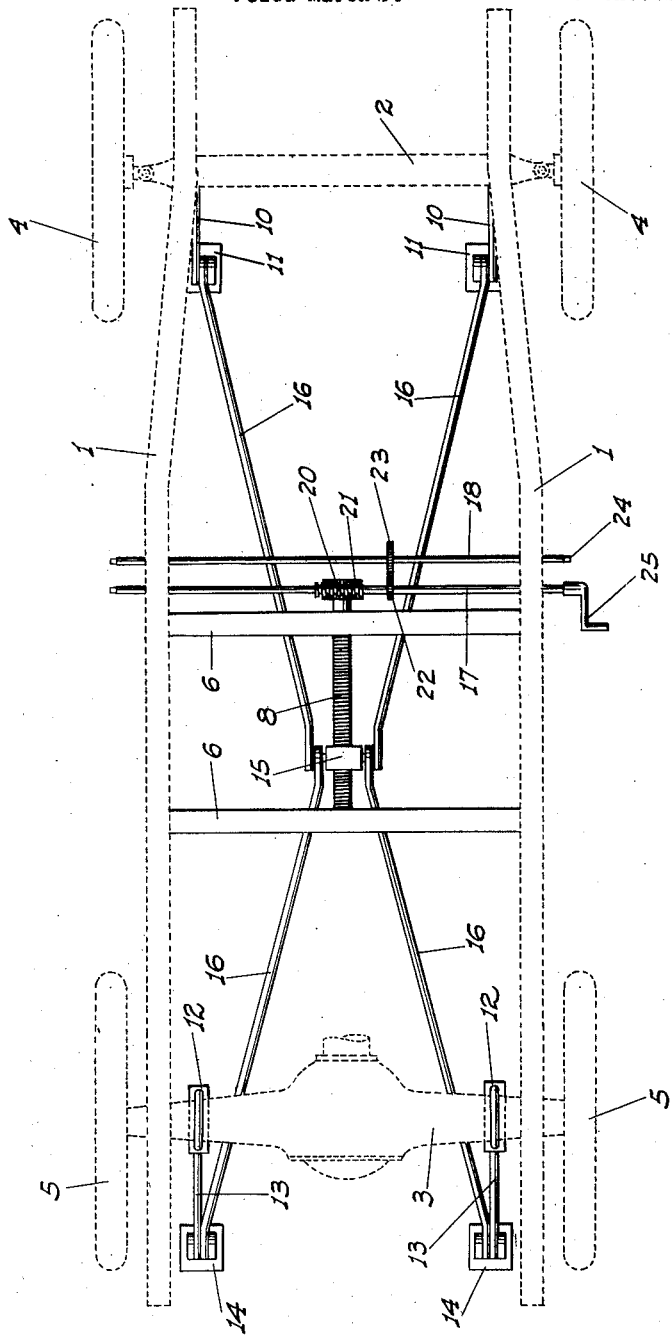
Fig. 1 is a top plan outline of an automobile chassis showing my improved jack structure installed thereon.

Referring now more particularly to the characters of reference on the drawings, the numeral 1 denotes the usual side frames of the car mounted in connection with which is the front axle 2 and the rear axle housing 3 which support the front wheels 4 and rear wheels 5 respectively.

My jack structure which is applied to such standard parts comprises a pair of transverse longitudinally spaced frames 6 secured to the frames 1. Bearings 7 mounted on said frames 6 centrally between the frames 1 form supports for a longitudinally disposed screw 8.

Fixed on and projecting below the axle 2 at suitable transverse spaced points thereon are bearing lugs 9 in which are pivoted the upper ends of arms 10, on the lower ends of which are pivoted ground engaging pads 11.

Likewise fixed on the rear axle housing 3 at suitable transversely spaced points are bearing lugs 12 in which are pivoted the upper ends of arms 13 on the lower ends of which are pivoted ground engaging pads 14. The length of both sets of the arms from the bearing lugs to the bottoms of the respective pads is such that when the arms are vertically disposed and the pads are bearing against the ground, the wheels of the car will then be raised from the ground at least a few inches.

Mounted on the screw is a block 15 movable along the screw with the rotation thereof, the said screw being itself held against longitudinal movement. Pivoted at one end in pairs on opposite sides of the block are arms 16 which extend forwardly and rearwardly to pivotal connections with the respective arms 10 and 13.

The parts are so arranged that when the block is adjacent one end of the screw all the jack arms are vertically disposed and the car is raised from the ground. When the block is adjacent the other end of the screw all said jack arms are turned toward the rear of the car and are raised to such an extent that the pads clear the ground the necessary distance to give proper road clearance. The pads being pivoted on the jack arms are always horizontally disposed and therefore engage the ground flatly when said arms are lowered.

To rotate the screw I provide a pair of transversely disposed shafts 17 and 18 which are turnably supported by bearing brackets 19 attached to the frames 1 and positioned beyond one end of the screw. The shaft 17 which is nearest the screw carries a worm 20 which meshes with a worm gear 21 on the adjacent end of the screw. The shaft 17 also has a pinion 22 mounted thereon which engages a gear 23 on the shaft 18, the gear 23 having a predetermined larger diameter than the pinion.

The ends of both shafts project beyond the frames 1 and are squared as shown at 24 to removably receive the hub of a crank handle 25. The handle is interchangeable on the shafts and may be applied at either end of the same.

After the handle is applied to the shaft 18, the shaft 17 will rotate at a greater speed than if the handle were applied to the shaft 17 with the same handle speed. The speed of rotation of the screw 8 and the movement of the various arms controlled by such screw rotation will therefore be correspondingly different.

In lowering the jack arms therefore the handle is preferably applied first to the shaft 18 to enable the arms to be quickly lowered, there being at first practically no resistance to the arm or screw movement. When the pads are about to engage the ground, the handle is shifted to the shaft 17, since the advantages had with slow speed and relatively great leverage are then necessarily made use of owing to the resistance offered to further screw and arm movement by the weight of the car which is now being lifted.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention what I claim as new and useful and desire to secure by Letters Patent is:

A jack structure for a motor vehicle having transversely spaced side frames comprising arms pivoted onto the vehicle adjacent the different wheels, ground engaging elements on the lower ends of the arms, a single screw shaft extending longitudinally of the vehicle and supported from the frame thereof, a block threaded on said shaft, connections between the block and arms to cause the latter to be turned on their pivots with the movement of the block along the shaft, a worm gear mounted on one end of said shaft, a worm engaging said gear, a transverse shaft mounted on and extending across both frames of the vehicle, another transverse shaft parallel to and adjacent said first named transverse shaft and also extending across both frames, a pinion on said first transverse shaft, and a gear on the other transverse shaft meshing with the pinion.

In testimony whereof I affix my signature.

LUIGI CALESTINI.